(12) United States Patent
Chaperon

(10) Patent No.: US 10,462,958 B2
(45) Date of Patent: Nov. 5, 2019

(54) PRODUCT DISCHARGE DEVICE FOR AN AGRICULTURAL MACHINE

(71) Applicant: EXEL INDUSTRIES, Paris (FR)

(72) Inventor: Fabien Chaperon, Paris (FR)

(73) Assignee: EXEL INDUSTRIES, Paris (FR)

( * ) Notice: Subject to any disclaimer, the term of this patent is extended or adjusted under 35 U.S.C. 154(b) by 175 days.

(21) Appl. No.: 15/647,650

(22) Filed: Jul. 12, 2017

(65) Prior Publication Data

US 2018/0014453 A1    Jan. 18, 2018

(30) Foreign Application Priority Data

Jul. 13, 2016    (FR) ...................................... 16 56743

(51) Int. Cl.
| | |
|---|---|
| *G01G 19/08* | (2006.01) |
| *G01G 19/12* | (2006.01) |
| *A01B 79/02* | (2006.01) |
| *A01C 7/00* | (2006.01) |
| *A01C 15/00* | (2006.01) |
| *A01C 23/00* | (2006.01) |
| *A01M 7/00* | (2006.01) |
| *A01B 79/00* | (2006.01) |

(52) U.S. Cl.
CPC ............ *A01B 79/005* (2013.01); *A01C 23/00* (2013.01); *A01M 7/0089* (2013.01); *A01M 7/0092* (2013.01); *A01C 7/00* (2013.01); *A01C 15/00* (2013.01); *G01G 19/08* (2013.01); *G01G 19/12* (2013.01)

(58) Field of Classification Search
CPC ...... G01G 19/08; G01G 19/12; A01B 79/005; A01C 23/00; A01C 7/00; A01C 15/00; A01M 7/0089; A01M 7/0092
See application file for complete search history.

(56) References Cited

U.S. PATENT DOCUMENTS

| | | | | | |
|---|---|---|---|---|---|
| 3,221,827 | A | * | 12/1965 | Spurlin ................. | G01G 11/00 177/1 |
| 3,241,716 | A | * | 3/1966 | Wahl .................... | G01G 11/003 222/45 |
| 3,981,195 | A | * | 9/1976 | Forney .................. | B65D 90/48 73/296 |
| 4,421,185 | A | * | 12/1983 | Koto ..................... | G01G 13/022 177/121 |
| 5,262,598 | A | * | 11/1993 | Stotler .................. | G01G 13/06 177/116 |
| 5,880,407 | A | * | 3/1999 | Flammang ........... | G01G 13/026 177/116 |
| 5,902,966 | A | * | 5/1999 | VonMuenster ........ | G01G 19/08 177/136 |
| 5,979,703 | A | * | 11/1999 | Nystrom ............... | A01C 15/00 111/903 |
| 6,013,880 | A | * | 1/2000 | McFarlane ........... | G01G 19/08 177/139 |

(Continued)

*Primary Examiner* — Randy W Gibson
(74) *Attorney, Agent, or Firm* — Burris Law, PLLC

(57) ABSTRACT

The present disclosure concerns a discharge device for a product dispersion assembly, for example intended to be attached on an agricultural machine, comprising a receiving element, such as a hopper, intended to receive the product, wherein the discharge device includes a mass measurement system configured to measure the mass of the receiving element.

14 Claims, 2 Drawing Sheets

(56) References Cited

U.S. PATENT DOCUMENTS

Figure 1:
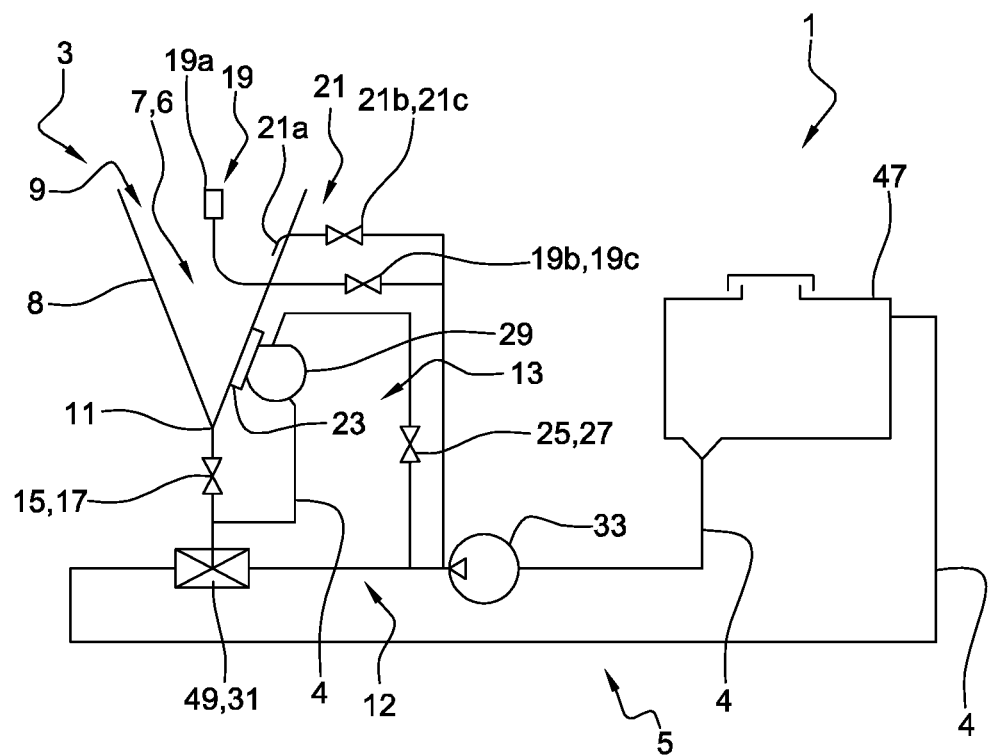

| | | | | |
|---|---|---|---|---|
| 6,396,003 | B1* | 5/2002 | Friesen | G01G 19/08 177/136 |
| 6,534,728 | B1* | 3/2003 | Spikings | A01B 59/069 111/903 |
| 6,732,667 | B1* | 5/2004 | Wilson | A01C 7/08 111/18 |
| 7,059,258 | B2* | 6/2006 | Wilson | A01C 7/08 111/18 |
| 7,196,276 | B1* | 3/2007 | Cope | G01G 19/083 177/116 |
| 9,869,577 | B2* | 1/2018 | Dierneder | G01G 19/08 |
| 2008/0078587 | A1* | 4/2008 | Johansen | G01G 19/08 177/136 |
| 2011/0220677 | A1* | 9/2011 | Bertolani | B60P 1/42 222/1 |
| 2012/0200697 | A1* | 8/2012 | Wuestefeld | G01F 1/00 348/137 |
| 2012/0204978 | A1* | 8/2012 | Ozamiz Fortis | B65D 90/48 137/552 |

* cited by examiner

PRODUCT DISCHARGE DEVICE FOR AN AGRICULTURAL MACHINE

CROSS-REFERENCE TO RELATED APPLICATIONS

This application claims priority to and the benefit of FR 16/56743 filed on Jul. 13, 2016. The disclosure of the above application is incorporated herein by reference.

FIELD

The present disclosure relates to a product discharge device for an agricultural machine, intended to be dispersed over crops.

BACKGROUND

The statements in this section merely provide background information related to the present disclosure and may not constitute prior art.

In general, agricultural products are introduced directly into a pulverizer. In some cases, the pulverizers have a product introduction opening at a height lower than 1.3 meters which allows access, from the ground, to an operator. In other cases, the introduction opening is slightly higher. A footboard then allows the operator to pour all of the liquid and solid products directly via this introduction opening. Such a manner of introducing the product in a pulverizer exposes the user and the environment to health risks due to contact with the product (projections during pouring, inhalation, pressing of the user against the soiled introduction opening). This way of introducing the product can expose the user to musculoskeletal disorders.

In order to overcome these risks, the agricultural machines have been equipped with a discharge device allowing an easier introduction of the product.

This solution has allowed reducing some of the aforementioned risks.

Nonetheless, it is not possible for the user to determine the exact amount of introduced product. The user then can only insert an amount of product that he will assess visually. It is then frequent that a too small or too large amount of product is introduced into the discharge device. The insertion of too small an amount of product results in a decrease of the work rate because it is necessary to stop the machine in order to introduce the lacking amount of product. The insertion of too large an amount of product leads to a waste of the product with non-negligible economic and environmental consequences. It is known to measure the amount of product to incorporate in the discharge device by measurement systems, for example a jug, a gauge or a scale. However, the measurement of the amount of product to introduce by these devices is time-consuming and inaccurate. Furthermore, additional handling of product is sometime necessary, possibly exposing the user to health risks. Finally, flushing of additional elements is necessary, thereby making the pulverization operations more complex.

SUMMARY

The present disclosure provides a discharge device for a product dispersion assembly, for example intended to be attached on an agricultural machine, comprising a receiving element, such as a hopper, intended to receive the product, characterized in that the discharge device comprises a mass measurement system configured to measure the mass of the receiving element.

Thanks to this arrangement, a user can improve management of the amount of product inserted into the discharge device. Indeed, the user is therefore informed of the precise amount of inserted product. The economic and environmental impacts are thus limited.

By product, is meant any type of agricultural products, for example crop protection products, inputs or biostimulants, in the liquid or solid state and in particular pulverulent products such as powder or granules.

By agricultural machine, is meant any type of movable agricultural machine of the tractor-drawn, tractor-mounted or self-propelled type, and more particularly any type of pulverization agricultural machine.

According to an aspect of the present disclosure, the mass measurement system is configured to measure and/or display the mass of the receiving element and of the product contained in the receiving element. Thanks to this arrangement, the user is informed of the mass of product contained in the discharge device and therefore provides more efficient management of the work rate.

According to an aspect of the present disclosure, the mass measurement system comprises a mass information transmission system configured to transmit a mass information to the user.

According to an aspect of the present disclosure, the mass information transmission system comprises a visual interface.

According to an aspect of the present disclosure, the visual interface comprises at least one visual marker corresponding to a predetermined mass information. According to an aspect of the present disclosure, the visual interface comprises a plurality of visual markers corresponding to a graduation of the mass information.

According to an aspect of the present disclosure, the visual interface comprises a movable indicator, configured to occupy a plurality of positions, each position corresponding to a mass information.

According to an aspect of the present disclosure, the movable indicator is disposed facing the plurality of visual markers. Thus, the user can establish a correspondence between the position adopted by the movable indicator and the closest visual marker to this position in order to determine the mass of product introduced into the receiving element.

According to an aspect of the present disclosure, the mass information transmission system comprises a communication interface configured to transmit a mass information to a user interface, intended to display the mass information. Thus, the information is easily accessible to the user.

According to an aspect of the present disclosure, the communication interface is configured to transmit the mass information to the user interface via an electrical signal.

According to an aspect of the present disclosure, the communication interface is configured to transmit the mass information to the user interface via a wireless communication protocol, for example a wireless communication protocol of a type compliant with the standard IEEE 802.11/WIFI or of a type compliant with the UMTS network standard or of a type compliant with any other network standard.

According to an aspect of the present disclosure, the mass information transmission system comprises the user interface, configured to display a mass information. Thus, the user interface is integrated in the mass measurement system.

According to an aspect of the present disclosure, the user interface is fixedly disposed proximate to the discharge device or to the controls of the agricultural machine.

According to an aspect of the present disclosure, the user interface is disposed on a mobile apparatus dependent on the agricultural machine, such as a remote control comprising a display window.

According to an aspect of the present disclosure, the communication interface is configured to interact with an external user interface.

According to an aspect of the present disclosure, the user interface is made in particular in the form of a Web interface hosted on a server and remotely or locally accessible via a terminal such as a stationary computer or via a portable terminal such as a laptop, a tablet or a smartphone.

According to an aspect of the present disclosure, the mass measurement system comprises a control unit arranged to transmit a mass information to the communication interface.

According to an aspect of the present disclosure, the mass measurement system comprises at least one mass sensor.

According to an aspect of the present disclosure, the discharge device comprises a frame and wherein the at least one mass sensor is disposed between the receiving element and the frame.

According to another form, the mass measurement system comprises one single mass sensor combined with an axis of rotation disposed between the support and the frame. The mass sensor is of the bending type. In this case, in order to guarantee a good accuracy of the measurement, it is desired that the distance between the sensor and the center of gravity of the introduced product is constant, and that frictions on the axis of rotation are negligible.

According to another form, not represented, the mass measurement system comprises one single sensor of the single-point load type between the support and the frame thereby having the advantage of allowing offsetting the sensor with respect to the center of gravity of the receiving housing and therefore positioning the receiving element in a cantilevered manner with respect to the frame.

According to another form, not represented, the mass measurement system comprises two sensors of the single-point load type between the support and the frame on either side of the receiving element thereby having the advantage of a better holding of the latter in contrast with the previous form.

According to an aspect of the present disclosure, the discharge device comprises a support on which the receiving element is configured to be disposed, and wherein the at least one mass sensor is disposed between the support and the frame.

According to an aspect of the present disclosure, the mass sensor comprises a strain gauge.

According to an aspect of the present disclosure, the at least one strain gauge is formed in the frame of the discharge device.

According to an aspect of the present disclosure, the mass measurement system is configured to control, according to a predetermined threshold value of the mass information:

the triggering of an audible and/or visual alarm; and/or
the opening of the closure element; and/or
the actuation of the fluid accelerator.

Thanks to these arrangements, the user is further notified by an alarm if the amount of product introduced into the discharge device is smaller or larger than a predetermined threshold amount.

By predetermined threshold value, is meant a mass or volume value, determined according to the amount of product to pulverize. The threshold value may be defined directly by the user or indirectly, that is to say electronically calculated according to external parameters set by the user, such as the surface to be treated, the type of soil to be treated, etc.

According to an aspect of the present disclosure, the opening of the closure element is controlled with a latency time, for example from 1 to 3 seconds, relative to the triggering of the audible and/or visual alarm, and/or relative to the stabilization of the mass information.

According to an aspect of the present disclosure, in the case where the threshold value is exceeded, the user is notified of the exceeding by a display on the user interface.

According to an aspect of the present disclosure, in the case where the threshold value is exceeded, the closure element is locked in a closed position. The opening of the closure element is then inhibited.

According to an aspect of the present disclosure, the receiving element comprises at least one smooth and/or anti-adhesive portion.

According to an aspect of the present disclosure, the receiving element comprises at least one portion having anti-adhesive properties.

According to an aspect of the present disclosure, the receiving element comprises at least one portion comprising an anti-adhesive coating.

According to an aspect of the present disclosure, the receiving element comprises at least one portion made of a metallic material, such as stainless steel or of a plastic, for example thermoplastic, material.

According to an aspect of the present disclosure, the discharge device comprises a system for measuring the filling of the receiving element.

Thanks to these arrangements, the user can deduce the density of the product inserted into the receiving element. Thus, the user is provided with several parameters enabling him to control the amount of product introduced into the receiving element.

According to an aspect of the present disclosure, the filling measurement system comprises a filling information transmission system configured to transmit a filling information to the user.

According to an aspect of the present disclosure, the filling information transmission system comprises a visual interface. Thus, the user can control more accurately the amount of product introduced into the receiving element.

According to an aspect of the present disclosure, the receiving element comprises at least one wall, defining a receiving housing.

According to an aspect of the present disclosure, the at least one wall comprises a transparent portion. Thus, the user can control more accurately the amount of product introduced into the receiving element.

According to an aspect of the present disclosure, the receiving element comprises an introduction opening and an outlet opening.

According to an aspect of the present disclosure, the transparent portion extends substantially from the outlet opening to the introduction opening.

According to an aspect of the present disclosure, the visual interface comprises the transparent portion.

According to an aspect of the present disclosure, the visual interface comprises at least a visual marker corresponding to a filling information of the receiving element. Thus, the user can control more accurately the amount of product introduced into the receiving element.

According to an aspect of the present disclosure, the transparent portion comprises a plurality of visual markers corresponding to a graduation of filling information. This arrangement allows improving the accuracy of the measurement of the amount of product introduced into the receiving element.

According to an aspect of the present disclosure, the receiving element comprises at least one filling detector disposed between the introduction opening and the outlet opening. Thanks to this arrangement, the measurement of the filling of the receiving element is carried out electronically. Hence, the margin of error in the measurement of the amount of product inserted into the discharge device is reduced.

According to an aspect of the present disclosure, the at least one filling detector comprises a presence sensor, a light sensor or a level sensor.

According to an aspect of the present disclosure, the filling information transmission system comprises a communication interface configured to transmit a filling information to a user interface, intended to display the filling measurement information. Thus, the filling information is easily accessible to the user.

According to an aspect of the present disclosure, the communication interface is configured to transmit the filling information to the user interface via an electrical signal.

According to an aspect of the present disclosure, the communication interface is configured to transmit the filling information to the user interface via a wireless communication protocol, for example a wireless communication protocol of a type compliant with the standard IEEE 802.11/WIFI or of a type compliant with the UMTS network standard or of a type compliant with any other network standard.

According to an aspect of the present disclosure, the user interface is fixedly disposed proximate to the discharge device or to the controls of the agricultural machine.

According to an aspect of the present disclosure, the user interface is disposed on a mobile apparatus dependent on the agricultural machine, such as a remote control comprising a display window.

According to an aspect of the present disclosure, the communication interface is configured to interact with an external user interface.

According to an aspect of the present disclosure, the user interface is made in particular in the form of a Web interface hosted on a server and remotely or locally accessible via a terminal such as a stationary computer or via a portable terminal such as a laptop, a tablet or a smartphone.

According to an aspect of the present disclosure, the filling measurement system comprises a control unit arranged to transmit a filling information to the communication interface.

According to an aspect of the present disclosure, the filling information transmission system and the mass information transmission system are configured to transmit a filling information and respectively a mass information to the same user interface. Thanks to these arrangements, the mass information and the filling information are displayed on the same interface. Hence, reading of the information is facilitated.

According to an aspect of the present disclosure, the user interface of the filling information transmission system and the user interface of the mass information transmission system are independent. Thus, the mass measurement system and the filling measurement system can operate independently of each other.

According to an aspect of the present disclosure, the control unit of the filling measurement system is arranged to provide information on the volume of product inserted into the receiving element.

According to an aspect of the present disclosure, the discharge device comprises a system for converting the mass information into a volume information from a density information of the product. Thanks to these arrangements, the user can be provided with a volume information instead of the mass information.

According to an aspect of the present disclosure, the mass information is a value expressed in a mass unit, for example in kilograms.

According to an aspect of the present disclosure, the volume information is a value expressed in a volume unit, for example in liters.

According to an aspect of the present disclosure, the conversion system can be configured by the user.

According to an aspect of the present disclosure, the discharge device comprises a vibration system configured to transmit a vibration movement to the at least one wall of the receiving housing.

Thanks to the arrangements according to the present disclosure, the product flows more easily along the wall of the receiving housing even when this wall is humid and therefore sticky. Furthermore, the discharge device according to the present disclosure allows limiting the risks of contamination of a user, for example during a maintenance or unclogging and flushing operation, the product residue on the wall of the receiving housing being lesser.

The arrangements according to the present disclosure also allow increasing the work rate.

According to an aspect of the present disclosure, the discharge device comprises a closure element arranged to obstruct the outlet opening.

According to an aspect of the present disclosure, the closure element is a valve.

According to an aspect of the present disclosure, the at least one wall of the receiving housing converges toward the outlet opening. Thus, the wall constitutes a ramp for guiding the product.

According to an aspect of the present disclosure, the introduction opening has a larger size than the outlet opening. Thus, it is easier for the user to pour the product into the discharge device and the risks of wastes of the product are therefore limited, and may even be eliminated.

According to an aspect of the present disclosure, the discharge device comprises a system for flushing the product containers intended to be emptied in the discharge device. This arrangement according to the present disclosure allows reducing waste of product by emptying the product into the discharge device in an improved manner.

According to an aspect of the present disclosure, the flushing system comprises a control element.

According to an aspect of the present disclosure, the control element of the flushing system comprises a valve.

According to an aspect of the present disclosure, the discharge device comprises a system for cleaning the at least one wall of the discharge device. Thanks to this arrangement, the at least one wall of the discharge device is cleaned thereby inhibiting contamination of the user. Advantageously, the discharge device comprises a system for cleaning all walls.

According to an aspect of the present disclosure, the cleaning system comprises a control element.

According to an aspect of the present disclosure, the control element of the cleaning system comprises a valve.

According to an aspect of the present disclosure, the vibration system is secured to the at least one wall. Thus, the vibration movement is transmitted mechanically to the at least one wall.

According to an aspect of the present disclosure, the securing of the vibration system to the at least one wall is reversible.

According to an aspect of the present disclosure, the vibration system is fastened to the at least one wall by a fastening system such as a dovetail joint, a screw and nut system cooperating with an opening in the wall, a screwing system throughout the thickness of the wall, etc.

According to an aspect of the present disclosure, the securing of the vibration system to the at least one wall is irreversible.

According to an aspect of the present disclosure, the vibration system is fastened to the at least one wall by welding.

According to an aspect of the present disclosure, the vibration system is disposed outside of the receiving housing.

According to an aspect of the present disclosure, the vibration system is independent of the at least one wall. For example, the vibration system is a striker, such as a hammer hitting the wall. For example, the hammer is a combination between an axis of rotation, an eccentric and a linkage.

According to an aspect of the present disclosure, the vibration system is disposed directly against the at least one wall.

According to an aspect of the present disclosure, the vibration system is disposed on a base fastened on the at least one wall.

According to an aspect of the present disclosure, the vibration system comprises a control element. Thus, the user can activate the vibration system when needed.

According to an aspect of the present disclosure, the discharge device comprises a portion of a hydraulic circuit fluidly linking the vibration system and the receiving housing, the vibration system being configured to operate on hydraulic energy. Thus, the energy source used for the operation of the vibration system is the product-based fluid.

According to an aspect of the present disclosure, the product is intended to be fluidified.

According to an aspect of the present disclosure, the vibration system is arranged to operate with a hydraulic source based on the fluidified product.

According to an aspect of the present disclosure, the control element of the vibration system comprises a valve.

According to an aspect of the present disclosure, the vibration system is arranged to operate by an oil-based hydraulic source.

According to one form, the vibration system is arranged to operate on electrical energy.

According to an aspect of the present disclosure, the control element of the vibration system comprises a switch.

According to an aspect of the present disclosure, the vibration system is arranged to operate at an electrical voltage to be chosen among 380 Vac, 220 Vac, 24 Vdc, 12 Vdc.

According to one form, the vibration system is arranged to operate on pneumatic energy.

The vibration system comprises a vibrator. By vibrator, is meant any type of mechanism producing a vibration movement, for example an imbalance vibrator, a ball vibrator, a roller vibrator, a piston vibrator, a striker vibrator or an electromagnetic vibrator.

According to one form of the present disclosure, the vibrator comprises a turbine unbalanced by an imbalance. The turbine is arranged to be driven in rotation by a hydraulic energy.

According to one form, the vibrator comprises a casing including a piston, arranged to be displaced by compressed air or through electromagnetism. The rapid back-and-forth movements of the piston cause linear percussions and therefore a vibration movement.

According to one form, the discharge device comprises a damping system arranged to dampen the vibration movement of the vibration system. Thus, the damping system allows concentrating the energy.

According to an aspect of the present disclosure, the damping system comprises at least one damper.

According to an aspect of the present disclosure, the damper of the damping system comprises at least one elastic element.

According to an aspect of the present disclosure, the elastic element may for example include a spring or an elastic pad.

According to an aspect of the present disclosure, the damper comprises a hydraulic cylinder.

According to an aspect of the present disclosure, the damping system comprises a support of the discharge device comprising a first portion secured to the discharge device, and a second portion, connected to a frame of the discharge device.

According to an aspect of the present disclosure, the frame of the discharge device is secured to the chassis of the agricultural machine.

According to an aspect of the present disclosure, the frame of the discharge device is movable relative to the chassis of the agricultural machine between a retracted position and a deployed position in which the introduction opening of the discharge device is intended to be accessible to a user.

According to an aspect of the present disclosure, the frame of the discharge device is independent of the chassis of the agricultural machine. Thanks to these arrangements, the bulk of the discharge device is compatible with the bulk of the dispersion device. Moreover, thanks to these arrangements, the adaptability of the discharge device is compatible with the different possibilities of integration on the different dispersion devices.

According to an aspect of the present disclosure, the elastic element is disposed between the first portion and the second portion of the support of the discharge device.

According to an aspect of the present disclosure, the elastic element comprises a first end, secured to the first portion of the support of the discharge device, and a second end, secured to the second portion of the support of the discharge device.

The present disclosure further relates to a dispersion assembly comprising:
a discharge device in accordance with any of the aforementioned features;
a dispersion device of the product.

According to an aspect of the present disclosure, the dispersion assembly comprises a hydraulic circuit fluidly linking the discharge device and the dispersion device.

According to an aspect of the present disclosure, a fluid is intended to circulate in the hydraulic circuit.

By fluid, is meant the product or a product fluidified by water or by a pure or diluted solvent.

According to an aspect of the present disclosure, the dispersion device comprises a pulverizer.

According to an aspect of the present disclosure, the dispersion assembly comprises a tank.

According to an aspect of the present disclosure, the dispersion device is arranged to collect the product in the tank before dispersing it.

According to one form, the portion of the hydraulic circuit and more particularly the vibration system, is in fluid communication with the hydraulic circuit. Thus, the energy source used for the operation of the vibration system is the product-based fluid. The operation of the dispersion assembly is facilitated.

According to one form, the vibration system is independent of the hydraulic circuit.

According to an aspect of the present disclosure, the hydraulic circuit comprises a plurality of interconnected conduits.

According to an aspect of the present disclosure, the hydraulic circuit comprises a fluid accelerator disposed downstream of the discharge device.

More particularly, the fluid accelerator is disposed downstream of the closure element of the discharge device.

According to an aspect of the present disclosure, the fluid accelerator comprises a Venturi system.

By Venturi system, is meant a conduit having a section with a determined size comprising a portion having a section with a smaller size, so as to form a fluid pressure differential and therefore cause an acceleration of the fluid.

According to an aspect of the present disclosure, the tank is disposed downstream of the fluid accelerator.

According to an aspect of the present disclosure, the hydraulic circuit comprises a pump, disposed downstream of the tank and upstream of the fluid accelerator.

According to an aspect of the present disclosure, the solvent is disposed in the tank.

According to an aspect of the present disclosure, the pump is configured to convey the solvent from the tank downstream of the closure element of the discharge device in order to fluidify the product.

According to an aspect of the present disclosure, the vibration system is linked to the pump, downstream of the latter.

According to an aspect of the present disclosure, the vibration system is connected to the hydraulic circuit between the closure element and the fluid accelerator.

Thus, when the vibration system is operating, the pump propels the fluid in the vibration system from the tank.

According to an aspect of the present disclosure, the flushing system is hydraulically connected to the pump.

According to an aspect of the present disclosure, the pump is configured to convey the solvent from to tank toward the flushing system.

According to an aspect of the present disclosure, the cleaning system is hydraulically connected to the pump.

According to an aspect of the present disclosure, the pump is configured to convey the solvent from the tank toward the cleaning system in order to clean the at least one wall of the receiving housing.

The present disclosure further concerns an agricultural machine comprising a dispersion assembly according to the aforementioned features.

The present disclosure further relates to a method for filling a discharge device in accordance with any one of the aforementioned features, comprising the steps of:

determining at least one threshold value of a mass information and/or of a volume information;

filling the receiving element until reaching the threshold value.

According to an aspect of the present disclosure, the filling method comprises a step of setting a setpoint value to the mass measurement system corresponding to the threshold value.

According to an aspect of the present disclosure, the filling method comprises, subsequently to the step of filling the receiving element, a step of opening the closure element and/or actuating manually or automatically the fluid accelerator.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 represents a dispersion assembly comprising a discharge device according to the teachings of the present disclosure;

FIG. 2 represents a discharge device according to the teachings of the present disclosure;

FIG. 3 represents one form of the mass measurement system according to the teachings of the present disclosure; and FIG. 4 represents another form of the mass measurement system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 represents a dispersion assembly 1 comprising a discharge device 3 and a dispersion device. The discharge device 3 and the dispersion device are in fluid communication with each other.

The dispersion assembly comprises a hydraulic circuit 5 arranged to hydraulically connect the discharge device 3 and the dispersion device. A fluid is intended to circulate in the hydraulic circuit 5. By fluid, is meant the product or a product fluidified by water or by a pure or diluted solvent. The hydraulic circuit comprises a plurality of interconnected conduits 4.

The dispersion assembly is arranged to be attached for example on an agricultural machine. By agricultural machine, is meant any type of movable agricultural machine of the tractor-drawn, tractor-mounted or self-propelled type, and more particularly any type of pulverization agricultural machine.

The discharge device 3 comprises a receiving element 6 comprising a wall 8 delimiting a housing 7 for receiving the product. The receiving element 6 is constituted by a hopper. The receiving housing 7 comprises an introduction opening 9 by which the product is intended to be inserted into the discharge device 3. The receiving housing 7 further comprises an outlet opening 11 by which the product is intended to join the pulverizer.

The discharge device 3 comprises a vibration system 13 configured to transmit a vibration movement to at least one wall 8 of the receiving housing 7. According to one form of the receiving housing 7, the latter comprises a truncated-cone shaped wall, substantially in a funnel-like shape. According to another form of the receiving housing 7, the latter comprises four planar walls converging toward the outlet opening 11. Thus, the product flows more easily along the wall 8 of the receiving housing 7. Furthermore, the discharge device 3 according to the present disclosure allows limiting the risks of contamination of a user, for example during a maintenance operation, the product residue on the wall 8 of the discharge device 3 being lesser. Thus, the work rate is increased.

By product, is meant any type of agricultural products, for example crop protection products, inputs or biostimulants, in the liquid or solid state and more particularly pulverulent products such as powders or granules.

The discharge device 3 comprises a closure element 15 arranged to obstruct the outlet opening 11. The closure element 15 comprises a valve 17.

The wall 8 of the discharge device 3 converges toward the outlet opening 11. Thus, the wall 8 constitutes a ramp for guiding the product. Thus, the receiving housing 7 has a funnel-like shape.

The introduction opening 9 has a larger size than the outlet opening 11. Thus, it is easier for the user to pour the product into the discharge device 3 and the risks of product wastes are therefore limited, and may even be eliminated.

The discharge device 3 comprises a system 19 for flushing the product containers intended to be emptied in the receiving housing 7 thus inhibiting waste of product. The flushing system 19 comprises a nozzle 19a and a control element 19b. The control element 19b of the flushing system 19 comprises a valve 19c.

The discharge device 3 comprises a system 21 for cleaning the wall 8 of the receiving housing 7. Thus, the wall 8 of the receiving housing 7 can be cleaned in order to allow inhibiting contamination of the user. The cleaning system 21 comprises a water exit ramp 21a and a control element 21b. The control element 21b comprises a valve 21c.

The vibration system 13 is secured to the wall 8. The vibration movement is transmitted mechanically to the wall. The vibration system 13 may be disposed directly against the wall 8. The vibration system 13 may also be disposed on a base 23 fastened to the wall 8.

The vibration system 13 comprises a control element 25. Thus, the user can activate the vibration system 13 when needed. The control element 25 of the vibration system 13 comprises a valve 27.

According to one form, the vibration system 13 is arranged to operate on hydraulic energy. The vibration system 13 may then operate thanks to a hydraulic circuit for example with oil, independent of the hydraulic circuit 5.

According to another form, the vibration system 13 is arranged to operate with a hydraulic source based on a mixture of the product with water, as represented in FIG. 1. The discharge device comprises a portion of a hydraulic circuit 12 fluidly connecting the vibration system 13 and the receiving housing 7. The portion of the hydraulic circuit 12 is in fluid communication with the hydraulic circuit 5. Thus, the energy source used for the operation of the vibration system is the product-based fluid. The operation of the dispersion assembly is facilitated.

According to an alternative to the forms described hereinabove, the vibration system 13 is arranged to operate on electrical energy. The control element 25 of the vibration system 13 then comprises a switch. The vibration system 13 is arranged to operate at an electrical voltage to be chosen among 380 Vac, 220 Vac, 24 Vdc, 12 Vdc.

According to an alternative to the forms described hereinabove, the vibration system 13 is arranged to operate on pneumatic energy.

The vibration system 13 comprises a vibrator 29. By vibrator 29, is meant any type of mechanism producing a vibration movement, for example an unbalance vibrator, a ball vibrator, a roller vibrator, a piston vibrator, a striker vibrator or an electromagnetic vibrator.

According to one form of the present disclosure, the vibrator 29 comprises a shaft configured to be driven in rotation, for example a turbine, comprising an offset mass, for example an imbalance. Thus, the shaft is unbalanced, which causes a vibration movement.

According to one form, the vibrator 29 comprises a casing including a piston, arranged to be displaced by compressed air or through electromagnetism. The rapid back-and-forth movements of the piston cause linear percussions and therefore a vibration movement.

Figure 2:
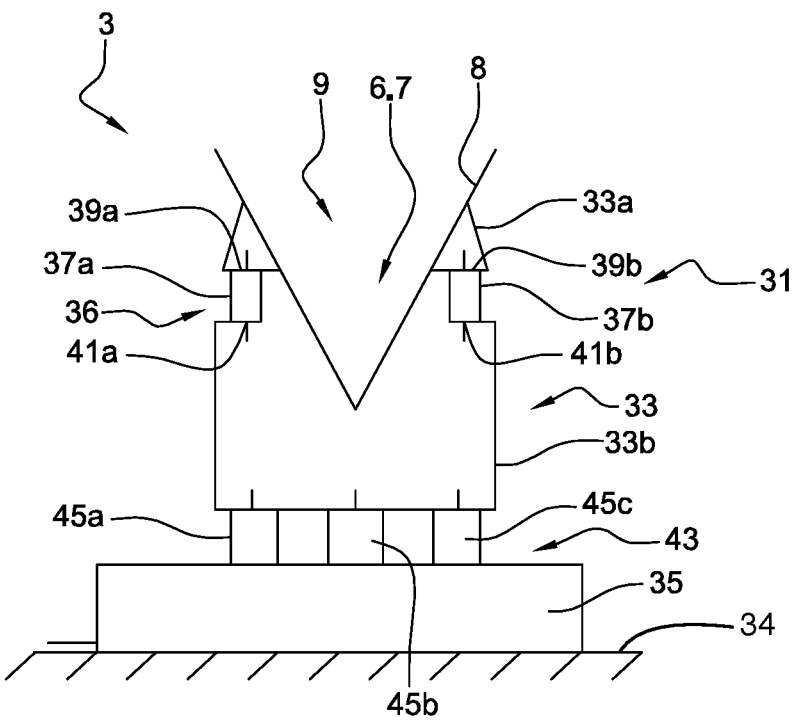

As represented in FIG. 2, the discharge device 3 further comprises a damping system 31 arranged to dampen the vibration movement of the vibration system 13. The vibration system comprises a damper 36.

The damping system 31 comprises a support 33 of the discharge device comprising a first portion 33a secured to the discharge device 3, and a second portion 33b, connected to a frame 35 of the discharge device 3.

According to one form, the frame 35 is secured to the chassis (e.g., at 34) of the agricultural machine.

According to another form, the frame 35 is movable relative to the chassis (e.g., at 34) of the agricultural machine between a retracted position and a deployed position in which the introduction opening 9 of the receiving housing 7 is intended to be accessible to a user.

According to another form, the frame 35 is independent of the chassis (e.g., at 34) of the agricultural machine. Thus, the bulk of the discharge device 3 is compatible with the bulk of the dispersion device.

The damper 36 comprises several elastic elements 37a, 37b which may be of the spring or elastic pad type. The elastic elements 37a, 37b are disposed between the first portion 33a and the second portion 33b of the support 33. Each of the elastic elements 37a, 37b comprise a first end 39a, 39b, secured to the first portion 33a of the support 33, and a second end 41a, 41b, secured to the second portion 33b of the support 33.

The discharge device further comprises a mass measurement system 43 configured to measure the mass of the receiving element 6. Thus, the user can provide better management of the amount of product inserted into the discharge device 3. Indeed, the user is therefore informed of the precise amount of inserted product. Thus, the economic and environmental impacts are limited.

The mass measurement system 43 is configured to measure the mass of the receiving element 6 and of the product contained in the receiving element 6. Thus, the user is informed of the mass of product contained in the discharge device and therefore provides more efficient management of the work rate.

The mass measurement system 43 comprises a mass information transmission system configured to transmit a mass information to the user. The mass information is a value expressed in a mass unit, for example in kilograms.

According to one form, the mass information transmission system comprises a visual interface. The visual interface may comprise visual markers each corresponding to a predetermined mass information, such as a graduation of the mass information. The visual interface further comprises a movable indicator, such as a needle, configured to occupy a plurality of positions, each position corresponding to a mass information. The movable indicator is disposed facing the plurality of visual markers. Thus, the user can establish a correspondence between the position adopted by the movable indicator and the closest visual marker to this position in order to determine the mass of product introduced into the receiving element.

According to another form, the mass information transmission system comprises a communication interface configured to transmit a mass information to a user interface, intended to display the mass information. Thus, the information is easily accessible to the user.

According to one form, the communication interface is configured to transmit the mass information to the user interface via an electrical signal.

According to another form, the communication interface is configured to transmit the mass information to the user interface via a wireless communication protocol, for example a wireless communication protocol of a type compliant with the standard IEEE 802.11/WIFI or of a type compliant with the UMTS network standard or of a type compliant with any other network standard.

According to one form, the mass information transmission system comprises the user interface, configured to display a mass information. Thus, the user interface is integrated in the mass measurement system.

According to one form, the user interface is fixedly disposed proximate to the discharge device or to the controls of the agricultural machine.

According to another form, the user interface is disposed on a mobile apparatus dependent on the agricultural machine, such as a remote control comprising a display window.

According to another form, the communication interface is configured to interact with an external user interface. The user interface may be made in particular as a Web interface hosted on a server and remotely or locally accessible via a terminal such as a stationary computer or via a portable terminal such as a laptop, a tablet or a smartphone.

The mass measurement system further comprises a control unit arranged to transmit a mass information to the communication interface.

The mass measurement system comprises three mass sensors 45a, 45b, 45c. The mass sensors 45a, 45b, 45c are disposed between the support 33 and the frame 35 in the form represented in FIG. 2.

Figure 3:
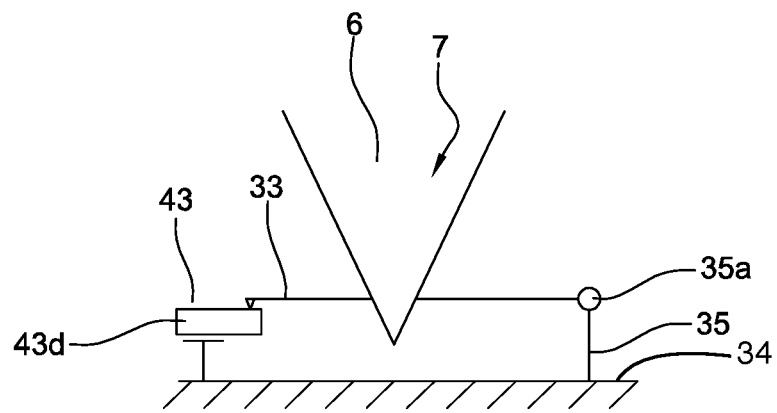

According to another form represented in FIG. 3, at least one mass sensor 43d of the bending type is combined with an axis of rotation 35a disposed between the support 33 and the frame 35. In this case, the receiving element 6 is rotatable relative to the frame 35. In order to provide a good accuracy of the measurement, it is desired that the distance between the sensor and the center of gravity of the product introduced into the receiving housing 7 is constant, and that frictions on the axis of rotation 35a are negligible.

Figure 4:
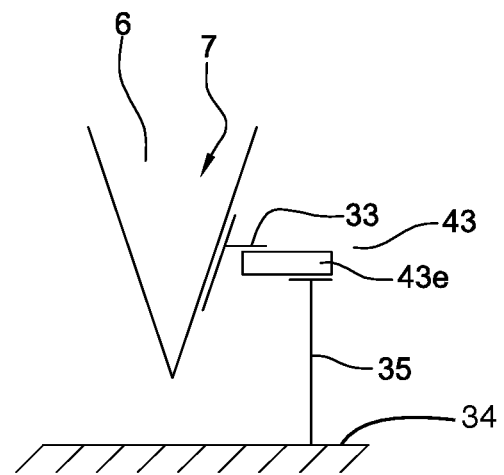

According to another form represented in FIG. 4, the mass measurement system 43 comprises one single mass sensor 43e of the single-point load type between the support 33 and the frame 35 thereby having the advantage of allowing offsetting the sensor with respect to the center of gravity of the receiving housing 7.

According to another form which is not represented, the mass measurement system 43 comprises a strain gauge. The strain gauge is formed in the frame 35. The support 33 is then disposed directly on the frame 35 at the level of the strain gauge.

According to one form, the mass measurement system 43 is configured to control the triggering of an audible or visual alarm when the mass information is higher and/or lower than a predetermined threshold value. Thanks to these arrangements, the user is further notified by an alarm if the amount of product introduced into the discharge device 3 is smaller or larger than a predetermined threshold amount.

The receiving element 6 comprises at least one smooth portion or having anti-adhesive properties. The receiving element may also comprise an anti-adhesive coating, such as a varnishing or a Teflon® coating. In one form, the receiving element is made of a metallic material, such as stainless steel or of a plastic, for example thermoplastic, material. The plastic material may have anti-adhesive properties.

The discharge device 3 may further comprise a system for measuring the filling of the receiving element. Thus, the user can deduce the density of the product inserted into the receiving element. Thus, the user is provided with several parameters enabling him to control the amount of product introduced into the receiving element 6. The filling measurement system also comprises a filling information transmission system configured to transmit a filling information to the user.

According to one form of the present disclosure, the filling information transmission system comprises a visual interface. Thus, the user can control more accurately the amount of product introduced into the receiving element. The wall 8 comprises a transparent portion (not shown) extending between the introduction opening 9 and the outlet opening 11. The visual interface of the filling information transmission system comprises the transparent portion. The visual interface may further comprise a plurality of visual markers each corresponding to a filling information of the receiving element 6, such as a graduation of filling information. Thus, the user can control more accurately the amount of product introduced into the receiving element 6.

According to another form of the present disclosure, the receiving element 6 comprises a filling detector disposed between the introduction opening 9 and the outlet opening 11. Thanks to this arrangement, the measurement of the filling of the receiving element 6 is carried out electronically. The margin of error in the measurement of the amount of product inserted into the discharge device 3 is thus reduced.

For example, the filling detector comprises a presence sensor or a light sensor.

According to another form of the present disclosure compatible with the features mentioned in the previous forms, the filling information transmission system comprises a communication interface configured to transmit a filling information to a user interface, intended to display the filling information. Thus, the filling information is easily accessible to the user.

According to one form, the communication interface is configured to transmit the filling information to the user interface via an electrical signal.

According to one form, the communication interface is configured to transmit the filling information to the user interface via a wireless communication protocol, for example a wireless communication protocol of a type compliant with the standard IEEE 802.11/WIFI or of a type compliant with the UMTS network standard or of a type compliant with any other network standard.

In the same manner as for the mass measurement system, the user interface may be fixedly disposed proximate to the discharge device or to the controls of the agricultural machine, or on a mobile apparatus dependent on the agricultural machine, such as a remote control comprising a display window or on an external user interface. The external user interface may be made in particular as a Web interface hosted on a server and remotely or locally accessible via a terminal such as a stationary computer or via a portable terminal such as a laptop, a tablet or a smartphone.

The filling measurement system may further comprise a control unit arranged to transmit a filling measurement information to the communication interface.

According to one form, the filling information transmission system and the mass information transmission system are configured to transmit a filling measurement information and respectively a mass information to the same user interface. Thanks to these arrangements, the mass information and the filling information are displayed on the same interface. Reading the information is thus facilitated.

According to one form, the user interface of the filling information transmission system and the user interface of the mass information transmission system are independent. Thus, the mass measurement system and the filling measurement system can operate independently of each other.

The control unit of the filling measurement system is arranged to provide information on the volume of product inserted into the receiving element. The discharge device comprises a system of conversion between a mass information and a volume information, thanks to a density information set by the user.

The mass information is a value expressed in a mass unit, for example in kilograms. The volume information is a value expressed in a volume unit, for example in liters. The hydraulic circuit 5 comprises a tank 47. The pulverizer is arranged to collect the fluid in the tank 47 before dispersing it.

The hydraulic circuit 5 further comprises a fluid accelerator 49 disposed downstream of the discharge device 3 and more particularly, downstream of the closure element 15 of the discharge device 3. The fluid accelerator 49 comprises a Venturi system 51. By Venturi system, is meant a conduit having a section with a determined size comprising a portion having a section with a smaller size, so as to form a fluid pressure differential and therefore cause an acceleration of the fluid.

The tank 47 is disposed downstream of the fluid accelerator 49. The product inserted into the discharge device 3 then passes at first via the fluid accelerator 49 before reaching the tank 47.

The hydraulic circuit 5 comprises a pump 53 disposed downstream of the tank 47. The pump 53 is connected downstream of the closure element of the receiving housing 7 and upstream of the fluid accelerator 49. The solvent is disposed in the tank 47. The pump 53 is configured to convey the solvent from the tank 47 downstream of the closure element 15 in order to fluidify the product.

The vibration system 13 is linked to the pump 53, downstream of the latter. The vibration system 13 is connected to the hydraulic circuit 5 between the closure element 15 and the fluid accelerator 49. Thus, when the vibration system 13 is operating, the pump 53 propels the fluid in the vibration system 13 from the tank 47. The unbalanced turbine is thus driven in rotation. A vibration movement is then generated and the vibration system 13 transmits this movement mechanically to the wall 8 of the discharge device 3.

The flushing and cleaning systems 19, 21 are hydraulically connected downstream of the pump 47.

A method for dispersing an agricultural product is described below.

In a first step, the filling of a discharge device 3 is carried out. First of all, at least one threshold value of a mass information and/or of a volume information is determined, then the receiving element 6 is filled until reaching the threshold value.

Optionally, the threshold value is set to the mass measurement system 43 as a setpoint value.

Afterwards, the closure element 15 is opened and/or the fluid accelerator is actuated manually or automatically.

For example, a product packed in 20 kilograms bags is provided. For an amount of product to be pulverized equal to 70 kilograms, the closure element 15 is opened, three bags of product are poured continuously, then the closure element 15 is closed, a threshold value of 10 kilograms is set to the mass measurement system 43, when the 10 kilograms threshold value is reached, the closure element is opened manually, or the mass measurement system 43 controls the opening of the closure element 15 in an automatic manner.

In a first step, the user operates the pump 53 which allows accelerating the fluid in the fluid accelerator 49. By Venturi effect, the latter creates a depression downstream of the closure element 15. In a second step, the user opens the closure element 15 to enable the flow of the product up to the fluid accelerator. In a third step, the user actuates the vibrator 29 by means of the valve 27 in order to facilitate the flow of the product along the wall 8 of the receiving housing 7.

In a fourth step, the user empties the product container in the discharge device 3. The product is then fluidified under the action of the fluid accelerator 49 downstream of the closure element 15 and transported toward the tank 47.

In a fifth step, when the incorporation of the different products is completed, the user modifies the hydraulic circuit 5 so that the pump 53 no longer aspirates in the tank 47 but rather in another tank of clean water, not represented.

In a sixth step, the user actuates the water exit ramp 21a via the valve 21c as well as the flushing nozzle 19a via the valve 19c, in order to clean the wall 8 of the cleaning system 21.

Of course, the present disclosure is not limited to the described and represented forms, given only but as illustrative and non-limiting examples.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A pulverization agricultural machine comprising:
an on-board dispersion assembly comprising:
a discharge device comprising:
a receiving element configured for receiving product; and
a mass measurement system configured to measure a mass of the receiving element;
a product dispersion device; and
a hydraulic circuit linking the discharge device and the dispersion device for fluid communication therebetween, wherein the hydraulic circuit is configured to circulate a fluid made of the product from the discharge device or the product from the discharge device after being fluidified by water or by a pure or diluted solvent.

2. The pulverization agricultural machine according to claim 1, wherein the mass measurement system comprises a mass information transmission system configured to transmit a mass information to a user.

3. The pulverization agricultural machine according to claim 2, wherein the mass information transmission system comprises a communication interface configured to transmit a mass information to a user interface, wherein the communication interface displays the mass information.

4. The pulverization agricultural machine according to claim 1, wherein the mass measurement system comprises at least one mass sensor.

5. The pulverization agricultural machine according to claim 4, wherein the discharge device further comprises a frame, wherein the at least one mass sensor is disposed between the receiving element and the frame.

6. The pulverization agricultural machine according to claim 4, wherein the at least one mass sensor comprises a strain gauge.

7. The pulverization agricultural machine according to claim 1, wherein the mass measurement system is configured to control at least one of a triggering of an audible alarm, a triggering of a visual alarm, an opening of a closure element, and an actuation of a fluid accelerator according to a predetermined threshold value of mass information.

8. The pulverization agricultural machine according to claim 1, wherein the receiving element further comprises at least one of a smooth portion, and an anti-adhesive portion.

9. The pulverization agricultural machine according to claim 1, wherein the discharge device further comprises a system for converting mass information into a volume information from a density information of the product.

10. The pulverization agricultural machine according to claim 1, wherein the discharge device further comprises a vibration system configured to transmit a vibration movement to at least one wall of the receiving element.

11. A method for filling the discharge device according to claim 1, the method comprising:
   determining at least one of a threshold value of a mass information and of a volume information; and
   filling the receiving element until reaching the threshold value.

12. The method for filling according to claim 11 further comprising the step of setting a setpoint value to the mass measurement system corresponding to the threshold value.

13. The method for filling according to claim 11 further comprising the step of filling the receiving element, the filling step comprising at least one of opening a closure element and actuating manually or automatically a fluid accelerator.

14. The pulverization agricultural machine according to claim 1, wherein the product dispersion device comprises a pulverizer.

* * * * *

UNITED STATES PATENT AND TRADEMARK OFFICE
CERTIFICATE OF CORRECTION

Page 1 of 1

PATENT NO. : 10,462,958 B2
APPLICATION NO. : 15/647650
DATED : November 5, 2019
INVENTOR(S) : Chapron It is certified that error appears in the above-identified patent and that said Letters Patent is hereby corrected as shown below:

On the Title Page

Item (72) Inventor, "Fabien Chaperon" should be --Fabien Chapron--.

Signed and Sealed this
Twelfth Day of May, 2020

Andrei Iancu
*Director of the United States Patent and Trademark Office*